United States Patent [19]

Clark

[11] Patent Number: 4,879,990

[45] Date of Patent: Nov. 14, 1989

[54] DISCHARGE COLLECTION SYSTEM

[76] Inventor: Andrew J. Clark, 1226 Sixty-second St., Downers Grove, Ill. 60516

[21] Appl. No.: 218,573

[22] Filed: Jul. 13, 1988

[51] Int. Cl.[4] .............................. F24B 3/00; F23J 1/00
[52] U.S. Cl. .................................... 126/25 R; 126/242
[58] Field of Search ............... 126/242, 383, 51, 25 R, 126/26, 245

[56] References Cited

U.S. PATENT DOCUMENTS

| | | | |
|---|---|---|---|
| 2,960,979 | 11/1960 | Stone | 126/30 X |
| 4,576,140 | 3/1986 | Schlosser | 126/9 B |
| 4,628,901 | 12/1986 | Poulos | 126/25 R X |
| 4,741,322 | 5/1988 | Lin | 126/242 X |
| 4,763,640 | 8/1988 | Schnack et al. | 126/243 |

Primary Examiner—Larry Jones

[57] ABSTRACT

A discharge collection system to mount on the diverging tubular legs of a discharge producing device. The collector includes clearances for inclined legs used in supporting the discharge producing device which allow for positioning the collector closer to discharge emitting openings, thereby enhancing collection and retention of discharge in turbulent environments. The collector and mounting system are designed for quick, sure, easy installation and operation without use of tools.

1 Claim, 4 Drawing Sheets 4,879,990

DISCHARGE COLLECTION SYSTEM

SUMMARY

This invention pertains to improvement in handling material discharged from a discharge producing device including ash, embers and pieces of charcoal briquettes discharged from a portable cooking grill supported on tubular legs arranged in a diverging configuration.

Charcoal cooking grills have been in existence for many decades and ash continues to be a byproduct of their operation which must be collected, handled and disposed. Improvements in cooking grill designs have lessened the effect of ash buildup within the grill by providing a grate on which to hold the charcoal fire. Ash from the grate now falls to the bottom of the grill where a limited amount accumulates before interfering with the combustion process. Some ash falls through air vent openings in the grill bottom and one grill design has sweeps for moving ash to vent openings which ends the need to shut down grill operation and partially disassemble it for ash removal.

The problem still remains of what to do about ash, embers and pieces of charcoal discharging from grill openings. Some grills are equipped with a shallow metal pan positioned below the grill bottom which is intended to catch ash falling from vent openings. These function for a limited amount of discharge in still air but are not practical in a wind. Specific problems with current designs are (1) the catcher is some distance from vent openings and wind carries discharge away before it reaches the catcher, (2) no provision to prevent wind from carrying ash off the catcher should it get there, (3) capacity for storage is very limited making it necessary to frequently remove ash from the catcher and (4) the removal process is troublesome and often messy because of spilled ash.

This invention addresses all of the above problems with current designs and provides significant improvements in all areas because (1) a greater portion of falling discharge is captured by the collector's wind break section, (2) most of what is captured is retained, (3) storage is sufficient to permit many grill operations between emptying of the collector and (4) the collector removal procedure is clean, quick and convenient. The area around the grill is not dirtied with ash nor hazardous because of hot embers which otherwise could be blown onto people, pets, combustibles or stepped on with bare feet because the collection system is effective.

DETAILED DESCRIPTION

This disclosure only exemplifies principles of the invention and is not intended to limit the invention to the embodiment illustrated herein.

Figure 1:
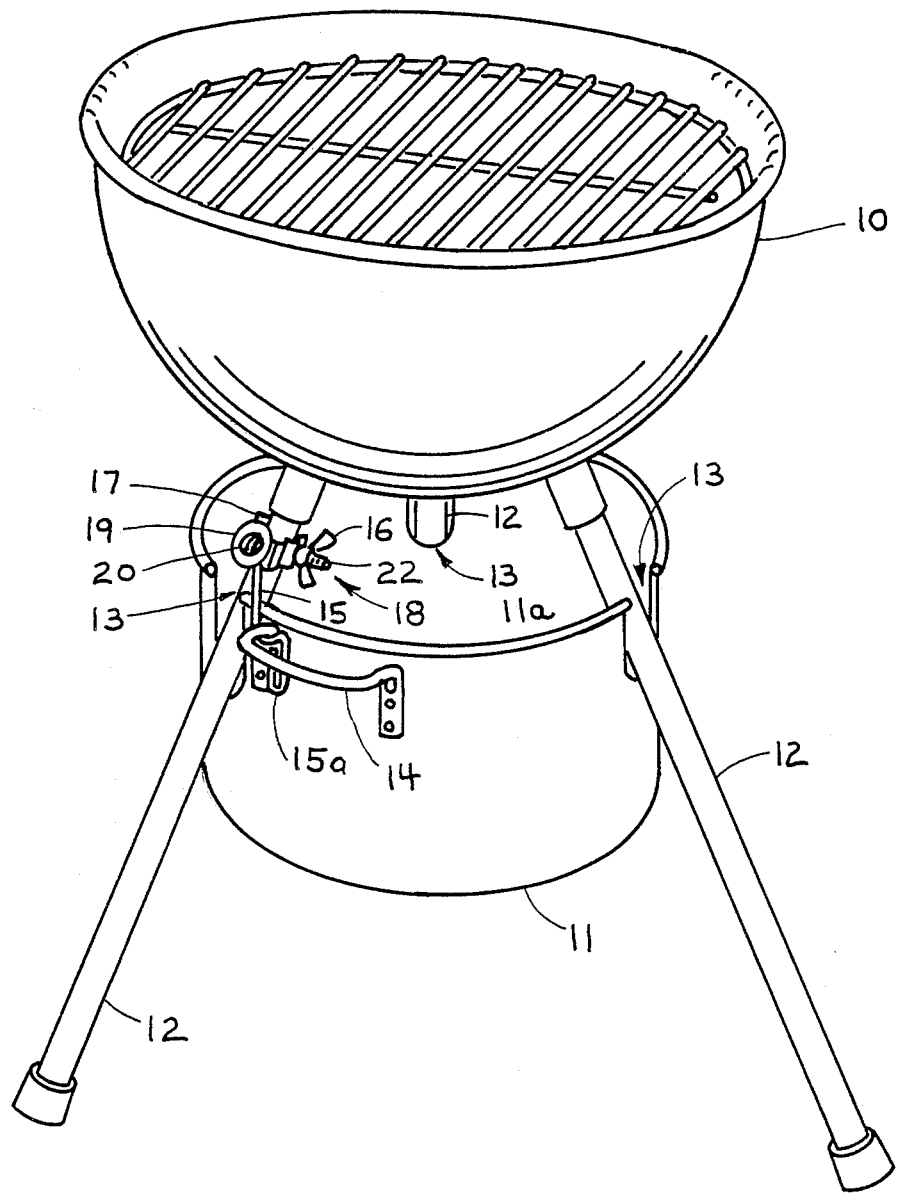
FIG. 1 is a perspective view of the collector in position on a cooking grill where it captures and keeps ash, embers and pieces of charcoal discharged from grill vent openings.

FIG. 1 shows the initial application of this invention on a cooking grill 10 supported by diverging, tubular legs 12 where divergence provides stability to the grill and leg assembly. The metal collector 11 is shown in position on the grill and leg assembly with legs 12 entered into slots 13 of the collector's vertical side. Slots 13 form wind breaks of the intervening collector side allowing the collector to be raised closer to the grill than has been the customary practice heretofore. The hook 15 of hanger assembly 18 which is clamped to grill leg 12 engages handle 14 of collector 11 and holds it in position on the grill assembly.

Figure 2:
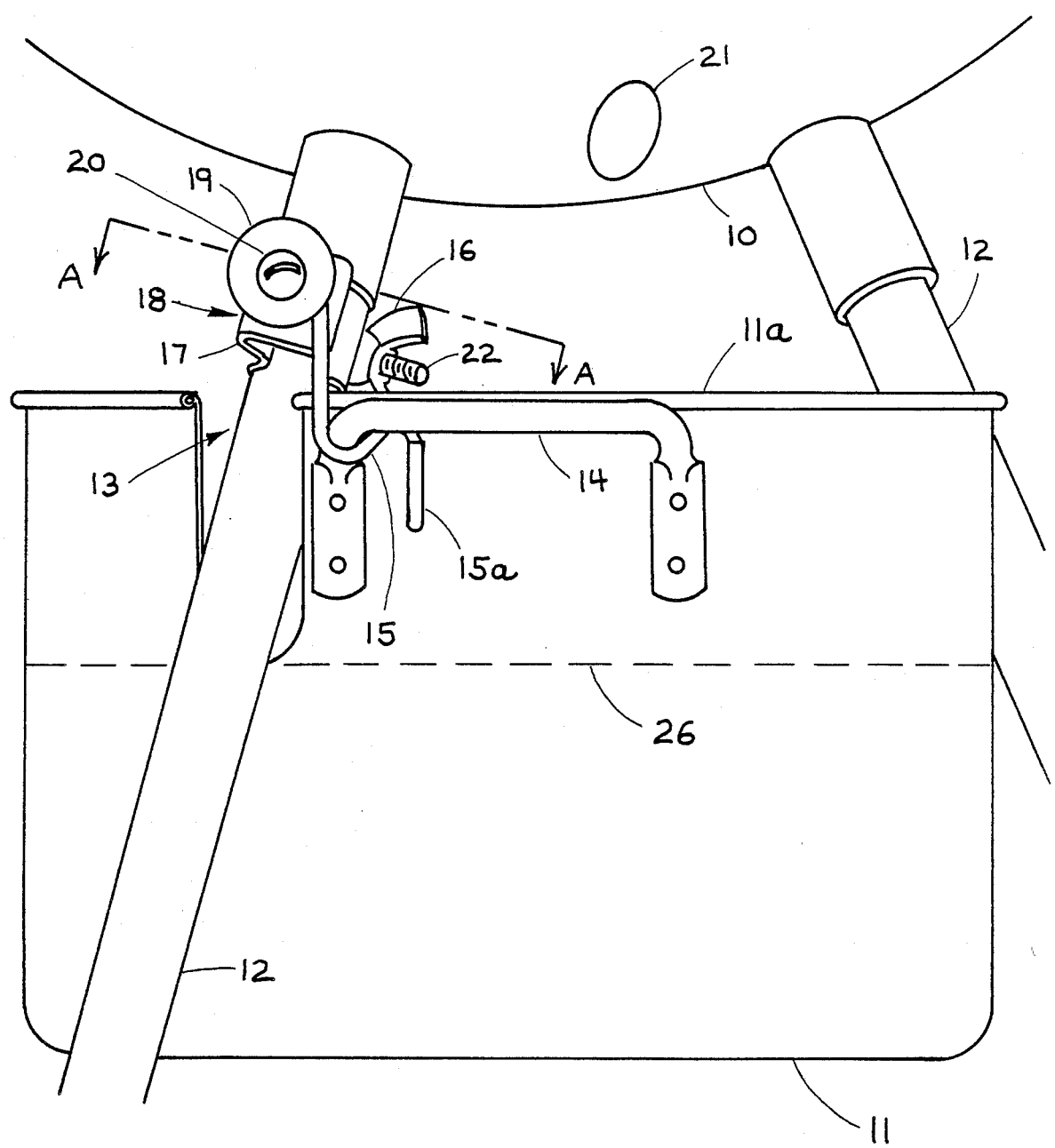
FIG. 2 is a profile view of the collector and the mounting features consisting of hanger assembly, collector handle and collector slots for holding the collector in position on a leg-supported cooking grill.

FIG. 2 shows hanger assembly 18 mounted on grill leg 12 where it is holding collector 11 below grill 10 and in position with respect to discharge opening 21. A discharge of ash, embers and charcoal can accumulate over many cooking operations until it builds up to the line-of-level-storage-capacity 26 as defined by the bottom of collctor slots 13 which definen the top of the collector's storage section.

The collector's two diametrically opposed handles 14 are situated in immediate proximity to grill legs 12 onto each of which a hanger assembly 18 has been installed. Hooks 15 are swung into position under the sides of handles 14 which are lowered unto the hooks for supporting the combined weight of the collector 11 and its contents. Hanger assemblies 18 are positioned high on legs 12 and recession of the latter into collector side slots 13 facilitates locating the collector rim 11a as close as practical to discharge openings 21. A hanger assembly 18 is installed on a leg 12 by first removing wing nut 16 and carriage bolt 22, spreading the legs of hook mount bracket 17 by hand until it will slide onto grill leg 12, replacing carriage bolt 22 and wing nut 16 and tightening the latter after positioning hanger assembly 18 on the leg 12.

Collector 11 has several distinct qualities not found in currently available ash catchers. The latter are essentially shallow pans whereas collector 11 resembles a deep pot. Collector 11 side height is sufficient to provide a wind break section consisting of the area between slots 13 and a large storage section below the slots. The top rim 11a of the collector 11 is about half the distance to grill discharge openings as with currently available ash catchers thereby capturing more falling discharge in windy conditions than the others. Catching discharge and keeping it, especially ash, are not the same in a windy environment. The difference with this invention is made by the collector's wind break section which is immediately above the storage section. This feature even allows ash to build up above the line-of-level-storage-capacity 26, below which is the storage section, without concern for wind carrying ash out of the collector 11. Material for the collector 11 must be capable of withstanding the high temperature of embers which frequently fall into the collector.

Figure 3:
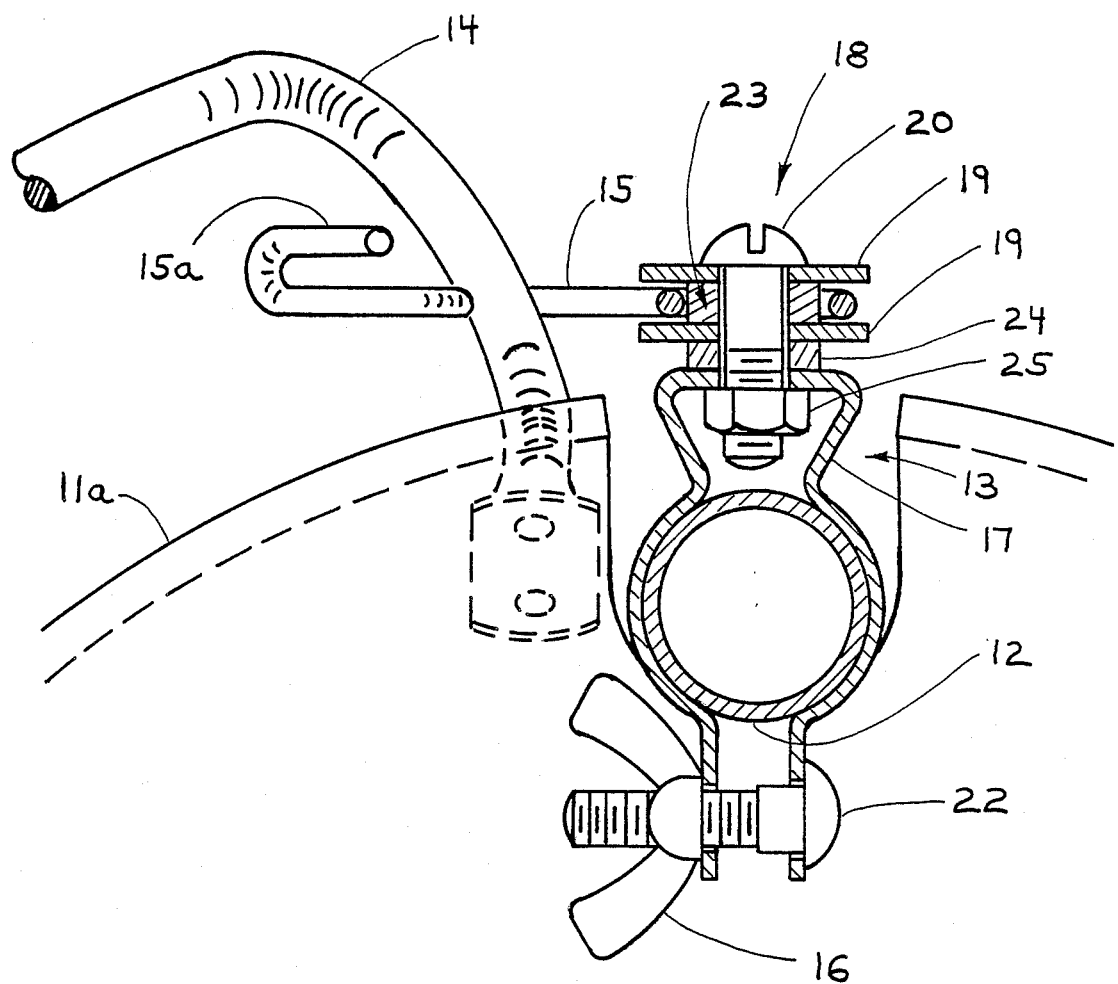
FIG. 3 is a cross-sectional view A—A, taken from FIG. 2, of the mounting system showing how it is held in place on the cooking grill leg and how its hook holds the collector by its handle.
Figure 4:
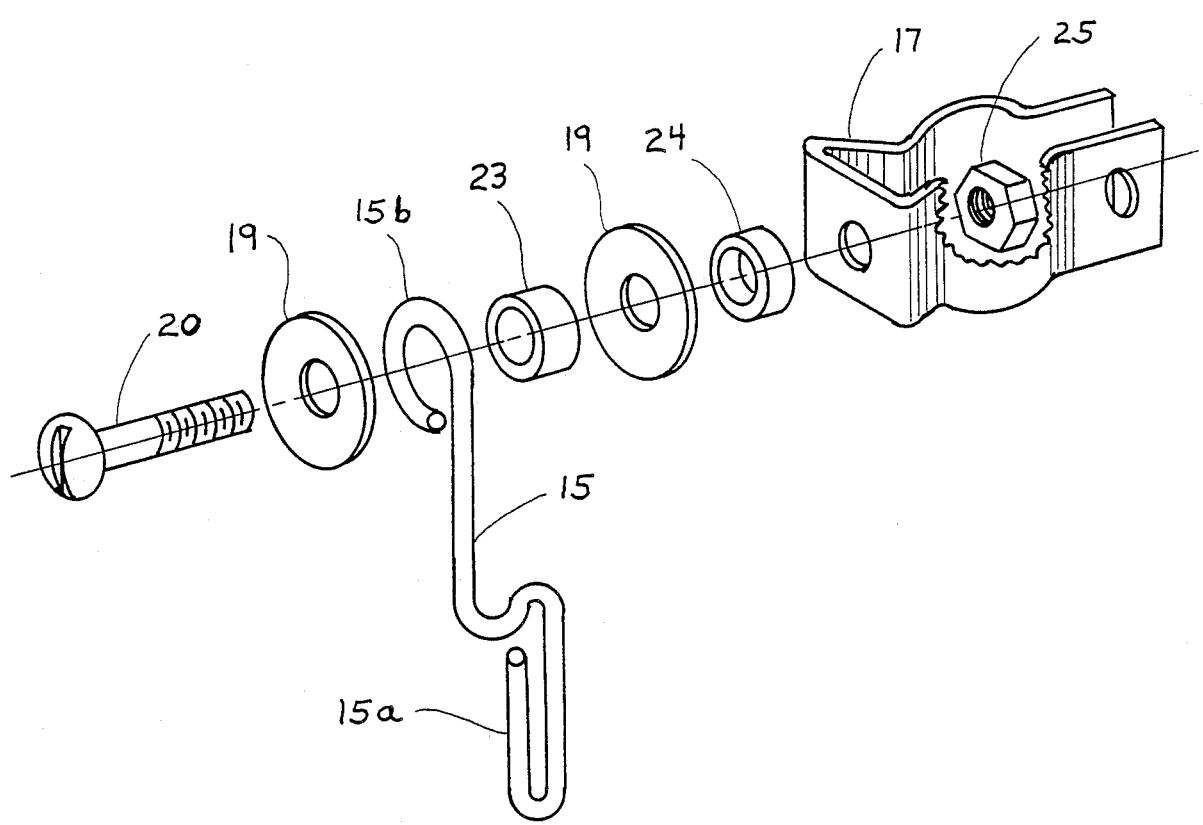
FIG. 4 is an exploded view of the hanger assembly showing its various components and their relative locations with respect to one another in forming the assembly.

The hanger assembly 18 employed in holding collector 11 in position has been designed to function with minimum motion and finger tip forces. Hook mounting bracket 17 is the frame of hanger assembly 18 upon which everything else is mounted, as well as, being used to secure the hanger assembly 18 in its operating position on grill support leg 12. Hook 15 is limited to its intended arcing movement without twisiting or sideways motions which would detract from the otherwise ease of operation. This controlled motion is achieved by designing the pivot with a diameter-to-width ratio of approximately 4-to-1. Hook 15 is formed from wire stock and its bearing loop 15b dimensions are not critical by virtue of the pivot design. The bearing loop of the hook rides on hook pivot 23 and between hook guides 19. Hook pivot 23, hook guides 19, hook spacer 24 and hook 15 are assembled on hook pivot screw 20 which is secured to hook mount bracket 17 with hook pivot nut 25 as shown in FIGS. 3 and 4. Diameter of the hook's bearing loop cannot be so small as to not fit in place and swing freely on hook pivot 23; otherwise, the diameter of the hook's bearing loop 15b is not critical and can very reasonably in size and still be servicable because it is trapped between hook guides 19 while the diametrical variance can be compensated for when positioning hanger assembly 18 on grill leg 12.

The hook operating lever 15a is an integral part of hook 15 and is created by extending hook material below the engaging area of the hook 15 where it is in an optimum position to be operated by a finger tip on the hand grasping adjacent collector handle 14.

The collector 11 with its two handles 14 and two hanger assemblies 18 form an integrated system for quick, convenient installation and removal of collector 11 with respect to cooking grill 10.

I claim:

1. A discharge collection system for collecting discharge from an emitting device such as a charcoal fired barbacue grill, said grill including a discharge opening and plurality of supporting legs, said collection system comprising a high sided discharge collector which includes a bottom, an open top, side walls and a plurality of handles protruding from the side walls of the collector; said side walls include a plurality of slots therein into which the plurality of legs extend, portions of the side walls between adjacent slots extending to close proximity to said discharge opening; wherein the collector assembly is supported on at least two of said plurality of legs by a hanger assembly which is rotatable into and out of engagement with the handles; wherein the collector is supported by the hanger assembly when in the engagement position and the collector can be removed when the hanger is moved to the out of engagement position.

* * * * *